Oct. 24, 1967 P. J. NIELAND 3,348,750

TAPE DRIVE ACTUATING MECHANISM FOR TAPE HANDLING MACHINES

Filed Oct. 12, 1965 2 Sheets-Sheet 1

INVENTOR.

PAUL J. NIELAND

BY

Merchant, Merchant & Gould

ATTORNEYS

TAPE DRIVE ACTUATING MECHANISM FOR TAPE HANDLING MACHINES

Filed Oct. 12, 1965 2 Sheets-Sheet 2

INVENTOR.
PAUL J. NIELAND
BY
Merchant, Merchant + Gould
ATTORNEYS 3,348,750
TAPE DRIVE ACTUATING MECHANISM FOR TAPE HANDLING MACHINES

Paul J. Nieland, St. Paul, Minn., assignor, by mesne assignments, to The Telex Corporation, Tulsa, Okla., a corporation of Delaware Filed Oct. 12, 1965, Ser. No. 495,259
5 Claims. (Cl. 226—90)

ABSTRACT OF THE DISCLOSURE

A tape drive actuating mechanism for moving the pressure roller of a tape drive from an inoperative below deck position to an operative above deck position adjacent the capstan and wherein the final portion of the arcuate movement of the pressure roller is at a slower rate so as to exert a relatively small inertial force and permit precise adjustment of the mechanism.

This invention relates generally to an improved tape handling machine, and more particularly it relates to improvements in the pressure roller actuating mechanism for the tape driving structure of such devices.

While this invention may be useful with respect to tape machines adapted to use various types of tape materials, the same has particular advantages when employed in connection with magnetic tape recording and playback machines. In magnetic tape handling machines, the tape is usually driven with respect to a transducer head by means of a power operated capstan and a cooperating idle puck or pressure roller for maintaining the tape in frictional driving engagement with the surface of the capstan.

In magnetic tape handling machines, the pressure roller is normally retractable away from the capstan to permit insertion of the tape between the capstan and the pressure roller. In some tape machines, such as in the type shown in the drawings hereof and particularly adaptable to handle tape cartridges, the pressure roller is retractable through an opening in the tape deck so that it may be moved between an inoperative position below the deck and an operative position above the deck and adjacent the capstan.

Accordingly, it is an object of this invention to provide a novel and improved means for actuating the pressure roller of the tape driving structure for a tape handling machine.

Another object of the present invention is the provision of improved means for actuating the pressure roller of a cartridge type magnetic tape machine between its below deck inoperative position and its above deck position adjacent the capstan.

Another object of this invention is the provision of pressure roller actuating means for the tape driving mechanism of a tape machine, wherein said means is relatively simple in construction, and may be quickly and easily manufactured and assembled.

Another object of the present invention is the provision of pressure roller actuating means for the tape driving mechanism of tape machines, which is efficient and trouble free in its operation and remains so throughout long periods of continued use.

Another object of the present invention is the provision of a pressure roller actuating mechanism which includes an efficient adjustment means to permit the quick and easy adjustment of the pressure roller in its operative position.

A still further object of the present invention is the provision of a pressure roller actuating mechanism which may be manufactured and assembled with economy and which is designed to provide long periods of operation with a minimum of servicing and maintenance.

The above and still further objects and advantages of the present invention will become apparent from a consideration of the following detailed specification, appended claims and drawings.

Referring to the drawings, wherein like reference characters indicate like parts or elements throughout the several views.

Figure 1:
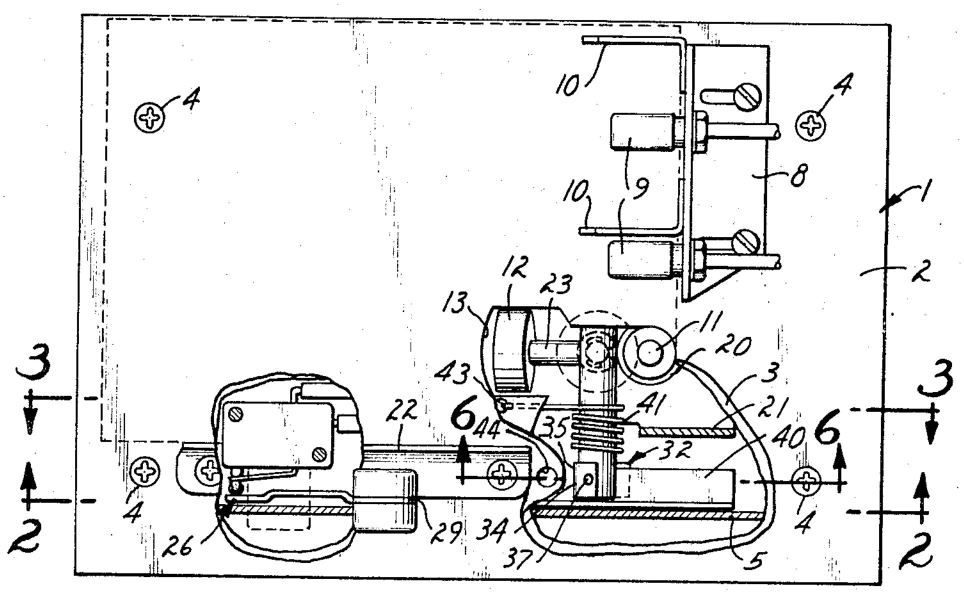
FIG. 1 is a view in top plan showing a tape handling machine incorporating the present invention, some parts being broken away and some parts being shown in section.

Referring again to the drawings, the various parts or elements of the tape handling machine shown and described herein are carried by a deck structure 1. The deck 1 is normally mounted on a box or casing structure, not shown, for housing the tape machine. The deck 1 is a composite structure comprising a top plate 2 and a subpanel 3 disposed in underlying relationship to the top plate 2 and secured by means of a plurality of screws 4. The subpanel 3 comprises depending side flanges 5, 6 and a front flange 7.

An elongated angle-shaped head bracket 8 is mounted on the upper surface of the top plate 2 of the deck 1 and is designed to carry in position one or more electromagnetic transducer heads 9. In addition to the heads 9, the bracket 8 also carries tape guides 10 for directing the tape, not shown, across the faces of the heads 9 in the desired position.

The outline of a tape cartridge is shown by dotted lines in FIG. 1, and for an example of the type of cartridge which may be utilized with the tape machine of the present invention, reference is made to U.S. Patent No. 3,096,920, issued July 9, 1963, to Wayne E. Schober. Although it will be understood that the present invention is not restricted to use on machines adapted to play tape cartridges, it should be noted that the tape cartridge shown by dotted lines in FIG. 1 may be of the type housing an endless coil of tape in which a playing loop thereof is moved across the face of the desired transducer head by means of a power driven capstan 11 and a cooperating idle pressure roller or puck 12. The cartridge will, of course, be provided with an aperture in its bottom wall to receive the retractable pressure roller 12 which cooperates with the rotary capstan 11 for transporting the tape to and from the reel, not shown, of the cartridge.

As shown in the drawings, the pressure roller 12 is swingably retractable from its operative tape driving position wherein it presses the tape into frictional driving engagement with the capstan 11 to an inoperative position below the upper surface of the deck top plate 2. Accordingly, the deck top plate 2 and the subpanel 3 are apertured, as at 13, to permit the retraction of the pressure roller 12 to its below deck inoperative position. With respect to the capstan 11, the same is power driven at a constant speed, and the capstan drive mechanism, which is only partially illustrated, comprises an electric motor 14 suspended below the subpanel 3 by means of a bracket 15. The motor 14 includes a pulley 16 connected by means of a resilient drive belt 17 to a large diameter speed reducing pulley 18 securely mounted on a spindle 19, the upper end portion of which defines a capstan 11. The capstan spindle 19 is mounted and journalled in the subpanel 3 by means of a bearing 20 carried by a bracket 21. As shown particularly in FIG. 2, the capstan 11 projects above the upper surface of the deck top plate 2 and is disposed with its axis generally perpendicular to the plane thereof.

An elongated guide flange 22 is secured to the upper surface of the deck top plate 2 in order to provide for the proper positioning of the tape cartridge with respect to the heads 9 and the capstan 11. The pressure roller 12 is retracted to its below deck position by means described hereinafter so that the tape cartridge shown by dotted lines in FIG. 1 may be inserted and removed from the deck 1 by sliding it back and forth on the upper surface of the deck top plate 2 while maintaining the same in proper alignment against the elongated guide flange 22.

Figure 4:
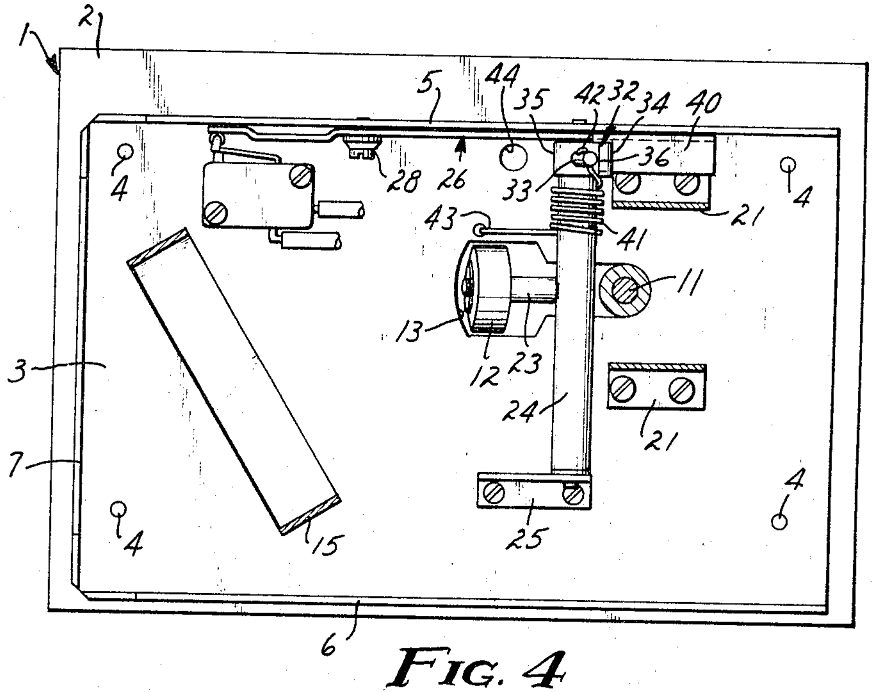
FIG. 4 is a view in bottom plan.

The idle puck or pressure roller 12, usually formed of rubber, is journalled for free rotation on the projecting end of a stub shaft 23 which is rigidly secured to and projects radially from the generally intermediate portion of an elongated oscillatory or rockshaft 24. The rockshaft 24 is pivotally mounted in the deck subpanel 3. More specifically, one reduced end portion of the rockshaft 24 is received in a bearing aperture defined by the depending side flange 5 of the subpanel 3, whereas the opposite reduced end portion of the rockshaft 24 is received in a bearing aperture defined by a bracket 25 secured to the underside of the subpanel 3, as shown particularly in FIGS. 4 and 5.

With this arrangement, the rockshaft 24 is mounted to enable the pressure roller 12 to be moved about an axis which is generally normal to and radially offset from the axis of the capstan 11.

With this arrangement, the pressure roller 12 is mounted on the rockshaft 24 to permit arcuate swinging movements about the axis of the rockshaft 24 toward and away from the capstan 11 and between an inoperative below deck position relatively widely spaced from the capstan 11 and an operative tape driving position wherein the resilient pressure roller 12 presses the tape into frictional driving engagement with the capstan 11. The present invention provides novel means for actuating the above-described swinging movement of the pressure roller 12. The novel actuating means more particularly comprises a slide, represented generally by the reference numeral 26, which is mounted and guided for generally straight line sliding movements in a path adjacent the depending side flange 5 of the subpanel 3 and which path is generally normal to the axis of the rockshaft 24. The elongated slide 26 defines an elongated slot 27 for reception of a cap screw 28 which is threaded into the side flange 5 in order to mount the slide 26 thereto, as shown particularly in FIGS. 3–5. Accordingly, the elongated slide 26 is disposed for sliding movements against the adjacent side surface of the flange 5 of the subpanel 3. The slide 26 defines an upstanding handle 29 which projects through an elongated slot 30 in the deck subpanel 3 and a corresponding elongated slot 31 in the deck top plate 2, as shown particularly in FIGS. 2 and 3.

Figure 2:
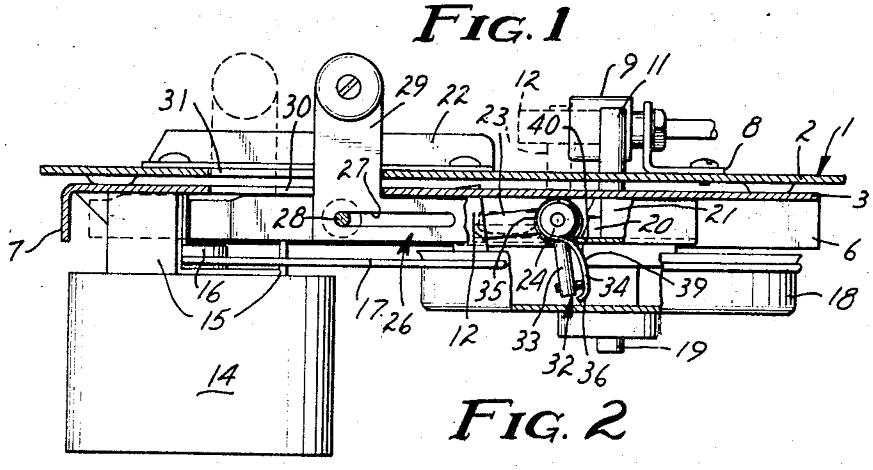
FIG. 2 is a view in vertical section taken approximately on the line 2—2 of FIG. 1, with alternate positions of some parts being shown by dotted lines.
Figure 3:
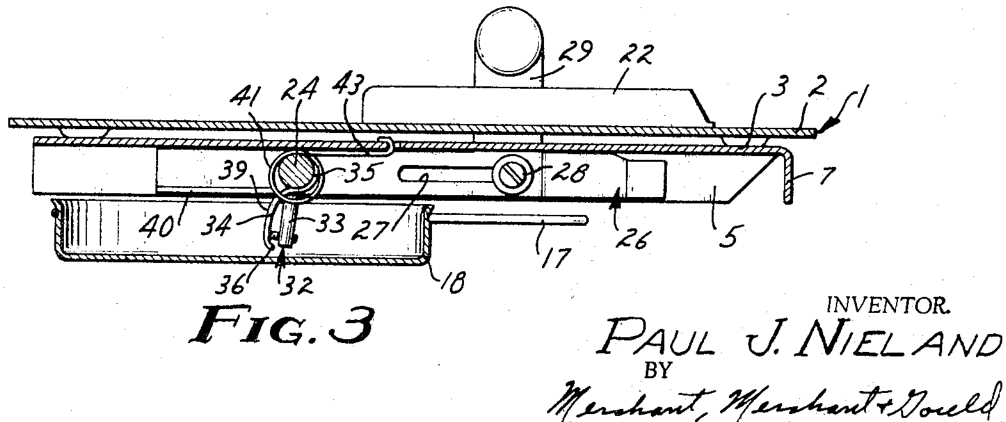
FIG. 3 is a view in vertical section taken approximately on the line 3—3 of FIG. 1.
Figure 6:
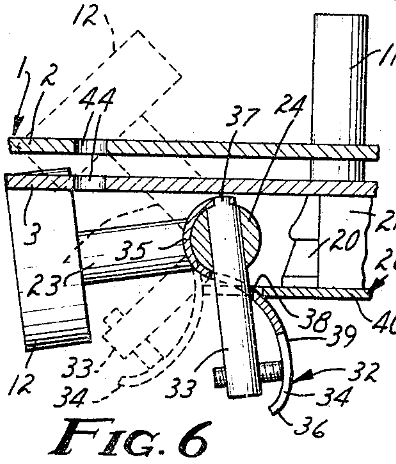
FIG. 6 is an enlarged view in section taken on the line 5—5 of FIG. 1, and showing the rockshaft and associated mechanism in various circumferential positions by dotted lines, some parts being broken away.
Figure 7:
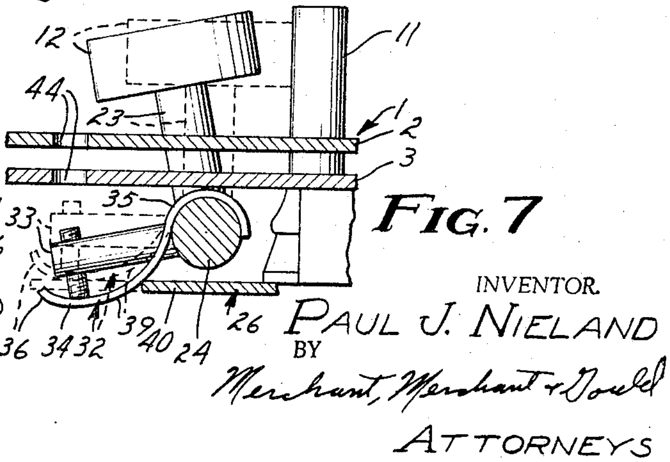
FIG. 7 is a view corresponding generally to FIG. 6 but showing different positions of the rockshaft and associated mechanism.

The actuating means for the pressure roller further comprises a cam arm, represented generally by the reference numeral 32, which is rigidly secured on the end of the rockshaft 24 adjacent the slide 26 and projects generally radially outwardly from the rockshaft 24. The cam arm 32 is movable in a generally arcuate path as shown in FIGS. 2, 6 and 7, between inoperative and operative positions corresponding to the inoperative and operative positions of the pressure roller 12, as described above. The cam arm 32 more particularly comprises a crank 33 rigidly secured to the rockshaft 24, as for example by means of a force fit within an aperture of the rockshaft 24.

Further, the crank 33 extends generally radially from the rockshaft 24 and is provided with a elongated bar 34 which has its inner end portion 35 connected to the rockshaft 24 and its outer end portion 36 extending generally radially and in somewhat general alignment with the crank 33. As shown particularly in FIG. 6, the inner end portion 35 of the elongated bar 34 is apertured to receive a reduced end portion 37 of the crank 33 and further extends around the rockshaft 24. In addition, a generally intermediate portion of the elongated bar 34 is apertured, as at 38, to receive the crank 33. With this arrangement, it will be apparent that the inner end portion of the elongated bar 34 is securely anchored to the rockshaft 24.

It is important to note that the elongated bar 34 is formed to define a curved cam surface 39 having a maximum degree of curvature located generally adjacent the connection of the crank 33 to the rockshaft 24 and curving therefrom in a gradually decreasing manner toward the outer end portion of the elongated bar 34. In other words, the bar 34 is defined so that its cam surface 39 has a maximum degree of curvature located generally adjacent the rockshaft 24 and extends generally outwardly therefrom in a curve having an expanding radius.

Figure 5:
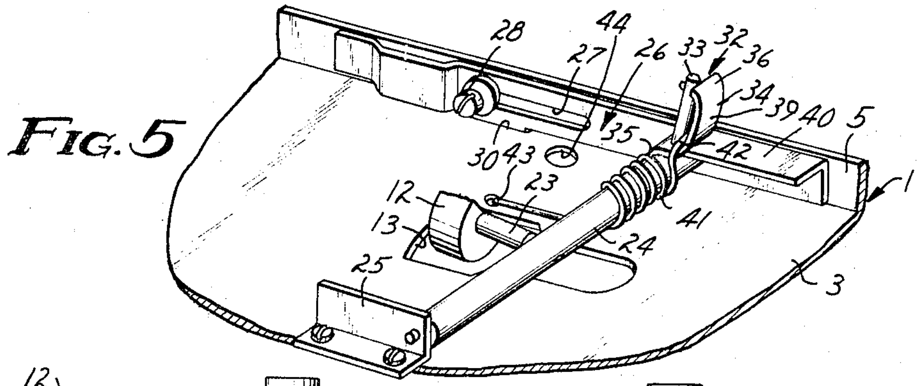
FIG. 5 is a view in perspective of the pressure roller actuating mechanism of the present invention, some parts being broken away.

As shown particularly in FIG. 5, the actuating slide 26 defines a drive element 40 which projects laterally of the direction of sliding movement of the slide 26 and into the path of movement of the cam surface 39 of the arm 32. The lateral flange or drive element 40 of the slide 26 is disposed and arranged relative to the cam arm 32 so as to engage the same when in its inoperative position and impart arcuate movements to the cam arm 32 (and therefore to the pressure roller 12) so as to move the pressure roller 12 from its inoperative to its operative position upon straight line generally unidirectional sliding movements of the slide 26. As shown particularly in FIGS. 4 and 5, a coil spring 41 is carried by the rockshaft 24 and is arranged to bias the cam arm 32 toward its inoperative position so as to return the pressure roller 12 to its inoperative position upon movements of the slide 26 in the reverse or opposite direction. One end 42 of the coil spring 41 is anchored on the crank 33, and the other end 43 of the spring 41 is received in an aperture defined by the subpanel 3, as shown particularly in FIGS. 4 and 5.

Referring to FIGS. 6 and 7, the inoperative, operative and intermediate positions of the cam arm 32 and the pressure roller 12 are shown therein. Initially referring to FIG. 6, it will be noted that the corresponding inoperative positions of the cam arm 32 and the pressure roller 12 are shown by full lines. However, upon movement of the slide 26 toward the dotted line position thereof shown in FIG. 2 (or toward the front of the machine), the forward edge portion of the drive flange or element 40 of the slide 26 engages the cam surface 39 at the portion thereof having generally the maximum degree of curvature, and upon continued straight line forward movement of the slide 26, arcuate movement is imparted to the rockshaft 24 and the pressure roller 12, as shown by dotted lines in FIG. 6. Continuance of the forward straight line movement of the drive element 40 of the slide 26 brings the cam arm 32 and the pressure roller 12 to the full line position of FIG. 7, whereat the drive element 40 begins to engage the cam surface 39 at a position thereof having a lesser or decreased degree of curvature (or expanded radius of curvature). Further, movement of the slide 26 by means of the handle 29 to its full forward position brings the cam arm 32 and the pressure roller 12 to the operative position shown by dotted lines in FIG. 7. Referring to the movement illustrated by FIGS. 6 and 7, it will be noted that the initial engagement of the drive element 40 with the portion of the cam surface 39 having the maximum degree of curvature provides a relatively great amount of arcuate movement of the pressure roller 12 per unit of straight line sliding movement of the slide 26. Whereas, when the drive flange 40 of the slide 26 is engaging the outer end portion of the cam surface 39, the same is acting against the portion of the cam surface having the decreased degree of curvature or expanded radius. This fact, coupled with the consideration that during the latter portion of the movement toward the operative position of the pressure roller 12, the drive element 40 is engaging a portion of the cam surface 39 which extends somewhat generally in the direction of sliding movement of the slide drive element 40, produces a relatively small amount of arcuate movement of the pressure roller 12 per unit of straight line sliding movement of the slide 26. This feature of the present invention not only permits precise adjustment of the final operative position of the pressure roller 12, as will be noted hereinafter, but also has the further advantage of permitting the presure roller 12 to be moved into its final operative position with relatively small inertia or driving forces so as to alleviate the possibility of damage or misadjustment to the related mechanism.

An important feature of the present invention is the provision of adjustment means carried by the outer end portion of the crank 33 for varying the spacing between the outer end portions of the crank 33 and the elongated bar 34 so as to permit adjustment of the final operative position of the pressure roller 12 relative to the capstan 11. Referring to FIGS. 6 and 7, it will be noted that said adjustment means comprises a set screw threaded into the outer end portion of the crank 33 and engaging the elongated bar 34, whereby the set screw may be adjusted relative to the crank 33 and toward and away from the adjacent outer end portion of the bar 34, access being had through the holes 44 in the deck 1.

It should be appreciated that the present invention may be utilized with advantage in connection with various types of tape handling machines; and further, it should be noted that the present invention is not limited to the curvature and design of the cam surface of the cam arm 32 shown in the drawings. This invention has been thoroughly tested and found to be completely satisfactory for the accomplishment of the above-noted objects; and while a preferred embodiment thereof in which the principles of the present invention have been incorporated has been shown and described above, it should be specifically understood that the same may be modified without departure from the scope and spirit of the appended claims.

What is claimed is:

1. A tape driving mechanism for use with a tape handling machine and comprising:

(a) a rotary power driven capstan having a surface for frictional driving engagement with one side of a tape, (b) a rockshaft mounted for rocking movements about an axis that is generally normal to the capstan axis, (c) an idle pressure roller adapted to engage the side of the tape opposite that engaged by the capstan so as to maintain the tape in frictional driving engagement with the capstan, (d) means mounting said pressure roller on the rockshaft for arcuate swinging movements about the axis of the rockshaft toward and away from said capstan between an inoperative position relatively widely spaced therefrom and an operative tape driving position wherein said pressure roller presses the tape into driving engagement with the capstan and wherein the axis of the pressure roller is generally parallel with the axis of the capstan, (e) means for actuating said swinging movement of the pressure roller, said means comprising:

(1) a slide mounted and guided for generally straight line sliding movements in a path that is generally normal to the axis of the rockshaft, (2) a cam arm secured on said rockshaft and projecting generally radially outwardly therefrom and being movable in a generally arcuate path between inoperative and operative positions corresponding to those of the pressure roller, (3) said slide including a drive element projecting laterally of the direction of sliding movement of said slide and into the path of movement of said cam arm, (4) said drive element being disposed and arranged relative to said cam arm to engage the same when in its inoperative position and impart arcuate movements to said cam arm and the pressure roller so as to move the latter from its inoperative to its operative position upon movement of the slide in one direction, and (5) means yieldingly biasing said cam arm toward its said inoperative position whereby to return said pressure roller to its inoperative position upon movements of said slide in the opposite direction, (6) said cam arm defining a curved cam surface having a maximum degree of curvature located generally adjacent said rockshaft and extending generally outwardly therefrom in a curve having an expanding radius.

2. A tape driving mechanism for use with a tape handling machine and comprising:

(a) a rotary power driven casptan having a surface for frictional driving engagement with one side of a tape, (b) a rockshaft mounted for rocking movements about an axis that is generally normal to the capstan axis, (c) an idle pressure roller adapted to engage the side of the tape opposite that engaged by the capstan so as to maintain the tape in frictional driving engagement with the capstan, (d) means mounting said pressure roller on the rockshaft for arcuate swinging movements about the axis of the rockshaft toward and away from said capstan between an inoperative position relatively widely spaced therefrom and an operative tape driving position wherein the pressure roller presses the tape into driving engagement with the capstan and wherein the axis of the pressure roller is generally parallel with the axis of the capstan, (e) means for actuating said swinging movement of the pressure roller, said means comprising:

(1) a slide mounted and guided for generally straight line sliding movements in a path that is generally normal to the axis of the rockshaft, (2) a cam arm carried by said rockshaft and movable in a generally arcuate path between inoperative and operative positions corresponding to those of the pressure roller, said cam arm comprising a crank secured to said rockshaft and extending radially outwardly therefrom, an elongated bar having its inner portion connected to said shaft and its outer end portion extending generally radially thereof in general alignment with said crank, said bar defining a curved cam surface having a maximum degree of curvature located generally adjacent the connection of said crank to the rockshaft and curving therefrom in a gradually decreasing manner toward the outer end portion of said bar, (3) said slide including a drive element projecting laterally of the direction of sliding movement of said slide and into the path of movement of said cam surface, (4) said drive element being disposed and arranged relative to said cam arm to engage the same when in its inoperative position and impart arcuate movements to said cam arm and the pressure roller so as to move the latter from its inoperative to its operative position upon movement of the slide in one direction, and (5) means yieldingly biasing said cam arm toward its said inoperative position whereby to return said pressure roller to its inoperative position upon movements of said slide in the opposite direction.

3. The structure defined in claim 2 in further combination with adjustment means carried by the outer end portion of said crank for varying the spacing between the outer end portions of said crank and said bar so as to permit adjustment of the operative position of the pressure roller relative to the capstan.

4. The structure defined in claim 2 in which said adjustment means comprises a set screw carried by the outer end portion of said crank and engaging said bar, said set screw being adjustable relative to said crank and toward and away from the outer end portion of said bar.

5. A tape driving mechanism for use with a tape handling machine and comprising:

(a) a rotary power driven capstan having a surface for frictional driving engagement with one side of a tape, (b) a rockshaft mounted for rocking movements about an axis that is generally normal to the capstan axis, (c) an idle pressure roller adapted to engage the side of the tape oppsoite that engaged by the capstan so as to maintain the tape in frictional driving engagement with the capstan, (d) means mounting said pressure roller on the rockshaft for arcuate swinging movements about the axis of the rockshaft toward and away from said capstan between an inoperative position relatively widely spaced therefrom and an operative tape driving position wherein the pressure roller presses the tape into driving engagement with the capstan and wherein the axis of the pressure roller is generally parallel with the axis of the capstan, (e) means for actuating said swinging movement of the pressure roller, said means comprising:

(1) a slide mounted and guided for generally straight line sliding movements in a path that is generally normal to the axis of the rockshaft, (2) a cam arm secured on said rockshaft and projecting generally radially outwardly therefrom and it being movable in a generally arcuate path between inoperative and operative positions corresponding to those of the pressure roller, said cam arm comprising a crank secured to said rockshaft and extending generally radially therefrom, an elongated bar having its inner end portion connected to said shaft and its outer end portion extending generally radially thereof in general alignment with said crank, the inner end portion of said bar being apertured and received on said crank and extending around said rockshaft for anchoring said bar on said shaft, said bar defining a curved cam surface having a maximum degree of curvature located generally adjacent the connection of said crank to the rockshaft and curving therefrom in a gradually decreasing manner toward the outer end portion of said bar, (3) said slide including a drive element projecting laterally of the direction of sliding movement of said slide and into the path of movement of said cam surface, (4) said drive element being disposed and arranged relative to said cam arm to engage the same when in its inoperative position and impart arcuate movements to said cam arm and the pressure roller so as to move the latter from its inoperative to its operative position upon movement of the slide in one direction, and (5) means yieldingly biasing said cam arm toward its said inoperative position whereby to return said pressure roller to its inoperative position upon movements of said slide in the opposite direction.

References Cited

UNITED STATES PATENTS

| | | | |
|---|---|---|---|
| 3,113,708 | 12/1963 | Moulic | 226—181 |
| 3,154,956 | 11/1964 | Eash | 226—181 X |

ALLEN N. KNOWLES, *Primary Examiner.*